March 22, 1938.   R. T. KILLMAN ET AL   2,111,633
SHOCK ABSORBER
Filed Oct. 24, 1936   5 Sheets-Sheet 3
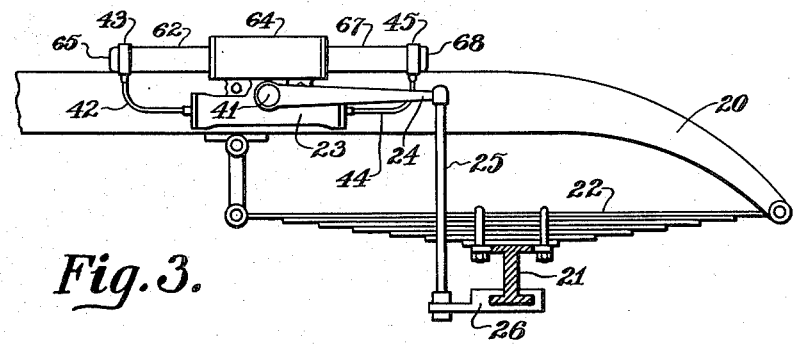
Fig. 3.
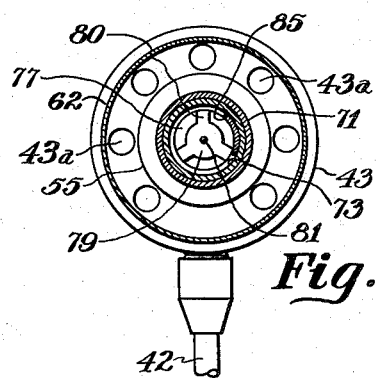
Fig. 4.
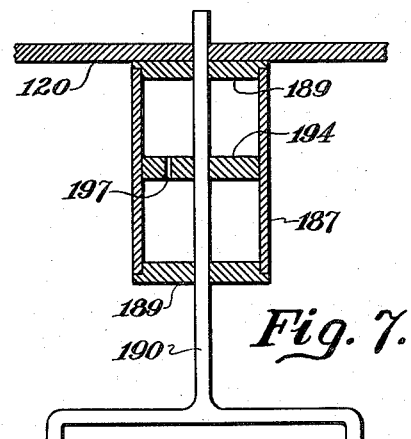
Fig. 7.
Fig. 5.
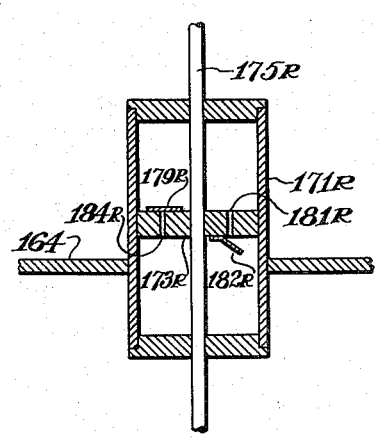
Fig. 6.
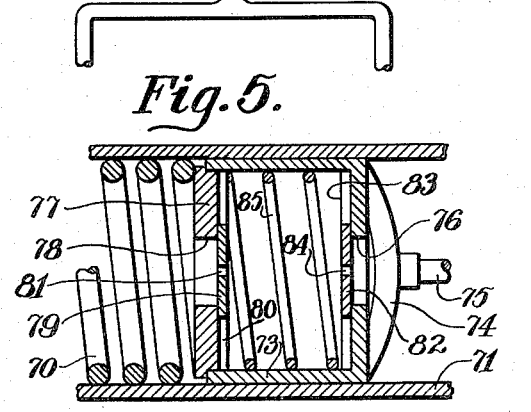
Inventors
Robert T. Killman
Thomas A. Killman
By Robert T. Killman
Attorney

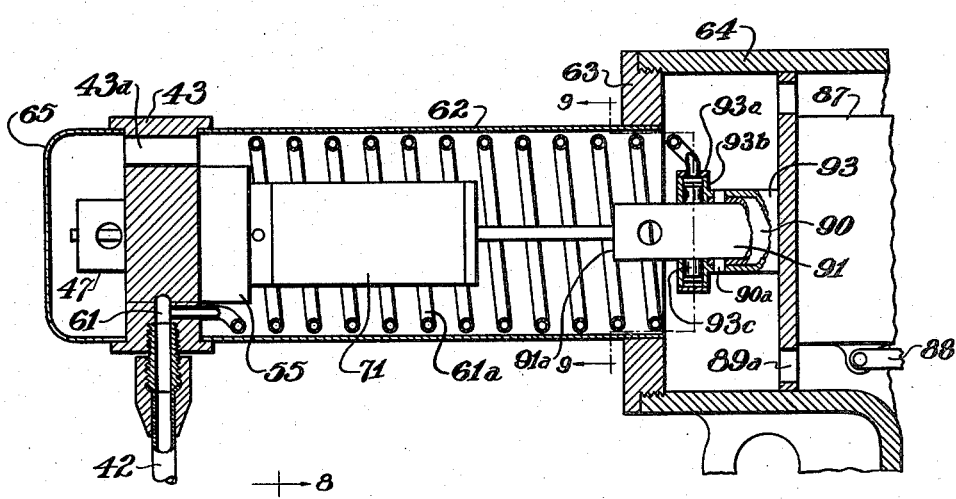
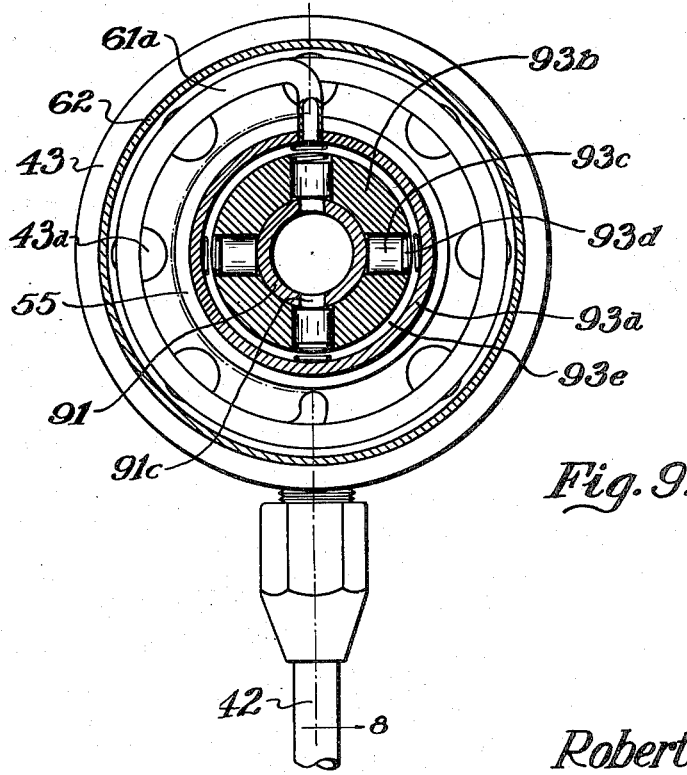
Fig. 8.
Fig. 9.
Inventors
Robert T. Killman
Thomas A. Killman
By Robert T. Killman
Attorney March 22, 1938. R. T. KILLMAN ET AL 2,111,633
SHOCK ABSORBER
Filed Oct. 24, 1936 5 Sheets-Sheet 5
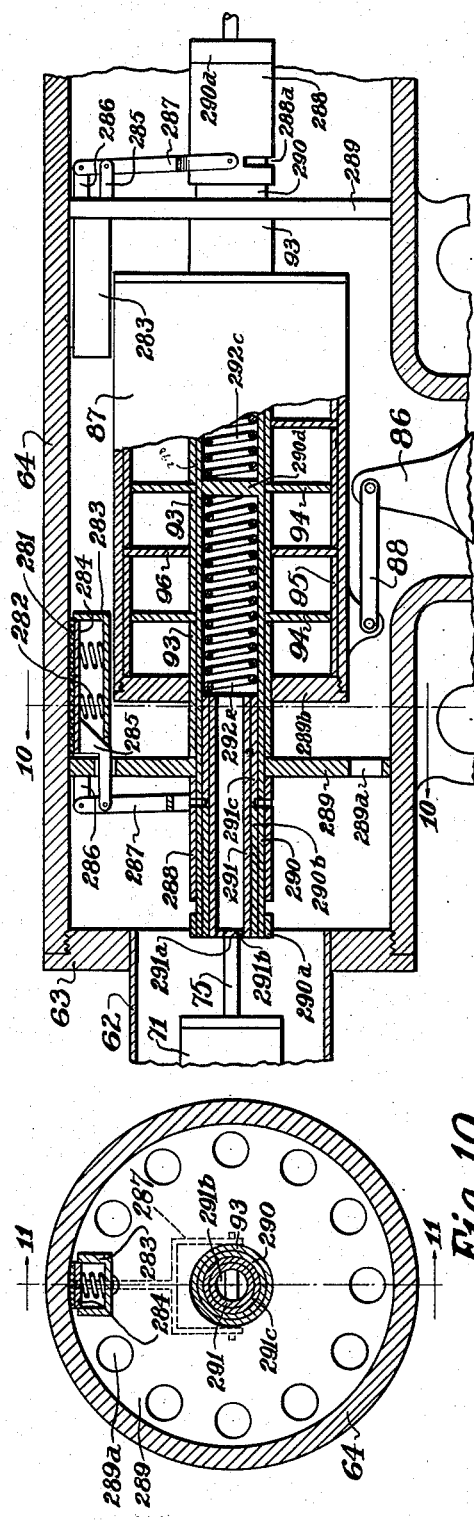
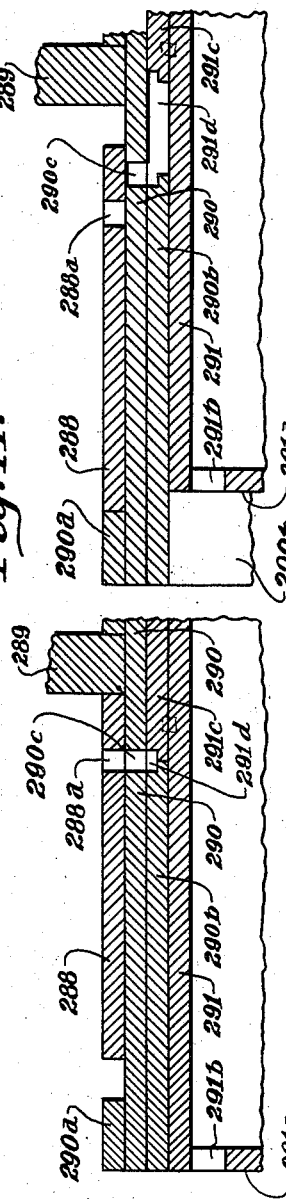
Robert T. Killman
Thomas A. Killman
INVENTORS.
BY Robert T. Killman
ATTORNEYS.

Patented Mar. 22, 1938

2,111,633

UNITED STATES PATENT OFFICE 2,111,633

SHOCK ABSORBER

Robert T. Killman and Thomas A. Killman, Nashville, Tenn.

Application October 24, 1936, Serial No. 107,325

15 Claims. (Cl. 188—88)

This invention relates to shock absorbers of the type used on automobiles, trailers and similar spring-suspended vehicles. The device belongs to the general class known as "free-center" shock absorbers. The basic principles of this invention may be embodied in shock absorbers of either the hydraulic or the friction type. For purposes of illustration we have chosen to describe and show in this application a preferred form of our invention as incorporated into a hydraulic shock absorber, and also a diagrammatic or simplified form of our invention as embodied in a friction shock absorber.

The complete mechanism may be divided into several units. First, there is the resistance unit which is connected between the vehicle body and the axles, that is, it is connected across the car springs. Its function is to resist relative movement of body and axle. There are various types of resistance units in use today, practically all falling in the two classes of hydraulic and friction devices. For the purposes of our invention either type may be used, the only requisites being that the amount of resistance offered by the unit to relative movements of body and axle be capable of being controlled, and that said resistance be substantially independent of the speed of said relative movement.

If the friction type unit be used and particularly if it be the dry-friction type, these two conditions are met simply. The amount of resistance may be varied by varying the pressure under which the friction surfaces operate, and the second requirement is met because of the inherent independence of the magnitude of dry friction to the speed of movement.

If the hydraulic type resistance unit is used a special valve which will be specifically described later is used in connection therewith. This valve forms the exit of the fluid from the displacement chamber of the hydraulic unit and is adjustable so that the resistance offered by the unit may be varied. The valve is so constructed, as will presently appear, that the resistance is substantially independent of the speed of the relative movement.

In the preferred embodiment of our invention a complete shock absorbing mechanism is to be used at each of the four wheels of the vehicle, and each mechanism is to be "double-acting", i.e. each shock absorbing mechanism is to incorporate two resistance units, one operating on the compression stroke only of the axle-body relative movement and the other acting solely on the rebound movement. This selective directional action may be secured by means of ratchets in the case of a friction type resistance unit or by check valves in the case of a hydraulic resistance unit.

The second unit into which the complete mechanism may be divided is the resistance control unit. The function of this control unit is to translate relative movements of axle and body into adjustments of the resistance offered by the resistance unit to such relative movements. In the shock absorber of this invention an initial deflection of the spring away from its normal static load position, by which is meant the position the ends of the spring occupy relative to each other when the vehicle is at rest and the spring is subjected to no other force than the load of the vehicle body, passengers, etc., is not resisted by the resistance unit of the device, the adjustment of which is normally for zero resistance, or for some relatively low minimum resistance which will be called zero resistance for the purposes of this explanation. The initial deflection of the spring in either direction away from its normal static load position produces, through the resistance control unit, a change in the adjustment of the resistance unit, which adjustment will become operative to cause the resistance unit to resist the return of the spring to its normal static load position. The magnitude of this change in adjustment is not, as in prior devices of this type, proportional solely to the magnitude of the deflection, but is proportional jointly to the magnitude of the deflection and to the time interval consumed by the deflection. Thus if the deflection be large and consume considerable time the change in the adjustment will be very great, but if the deflection be large but takes place very quickly, the adjustment change will not be so great. Similarly, if the deflection be small but the time consumed be large the change in adjustment will not be so great. If the deflection is small and takes place quickly the change in adjustment will be very small.

In dealing with vehicle bodies mounted on springs, the slowest deflections, i. e., those which consume the most time are those which approximate the natural period of the vibratory mass. The fastest deflections, i. e. those consuming the least time are those produced by the vehicle wheels encountering small irregularities in the road surface at high car speed. In the shock absorber of our invention these latter, small, quick deflections produce no appreciable change in the adjustment of the resistance unit.

It is an object of our device to resist the return of a spring from a deflected position to its normal static load position when the energy stored up in the spring is being transferred from the spring to the car body by imparting momentum to said body, but not to resist such spring movement when the stored up energy is being returned to the axle. This means that the comparatively slow body swings are resisted, while the fast axle movements are not resisted, except in so far as they are resisted due to the body swings being resisted by a resistance unit connected between body and axle.

After the initial deflection of the spring away from the static load position ceases and the return movement toward static load position begins the resistance unit becomes operative to resist this return movement to whatever extent that its adjustment has been set by the resistance control unit. As the spring movement continues toward static load position, the adjustment of the resistance unit decreases toward zero resistance. The manner in which this decrease takes place is also controlled by the resistance control unit.

While we do not wish to be limited as to the resistance levels employed in our device we have found that it is desirable that the resistance introduced at the beginning of the return to static load position be just slightly less than the tension in the spring in its deflected position, and that the decrease in adjustment from this point to zero resistance consume approximately the same time interval that would be consumed by the spring (and body attached) in returning from this position to normal static load position if the vibratory system (made up of body and spring) were critically damped (the axle being stationary). Thus if the rate of the spring were P pounds per inch and the deflection from static load position were L inches there would be stored in the spring LP pounds of force. Then according to our invention the resistance unit should offer at this point slightly less than LP pounds resistance. Suppose that a car body having a mass M were supported upon such a spring and that the system were critically damped. If then T seconds were the time required for the body and spring to return from the deflected position through the distance L to the static load position, then the time required for the resistance control unit to decrease the adjustment from LP pounds resistance to zero resistance should be approximately T seconds. However it is within the province of our invention to make use of much lower levels of resistance, and different rates of decrease from those above indicated. The resistance adjustment does not necessarily reach zero adjustment at the same time the spring reaches its normal static load position; but may be timed to reach zero later.

Since our device is a "free-center" shock absorber provision is made to adjust the "center" for various loads and therefore the third unit of our invention is a "load change compensator". This load change compensator simply compensates for the effects upon the resistance control unit of changes in the normal static load position due to changes in the load upon the vehicle body.

It is among the objects of the present invention to provide a shock absorber capable of adjusting itself automatically in accordance with the nature of the road surface over which the vehicle is being operated whereby said shock absorber will properly resist relative movements between the body and axles of the vehicle.

Another object of the present invention is to provide a shock absorber which will dissipate energy stored up in the vehicle springs in proportion to the amount of energy which would otherwise be transmitted to the body and frame of the vehicle to cause objectionable movements thereof.

It is an important object of our invention to provide a shock absorber which will oppose the return of a vehicle spring and body from a deflected position in either direction toward its normal static load position with a continuously diminishing resistance, the initial or highest degree or magnitude of said resistance to be proportional to both the distance the said deflected position lies from the normal static load position and the time consumed by the spring and body in traveling from the normal static load position to the deflected position.

Another important object of our invention is to provide a shock absorber which will oppose the return of a vehicle spring and body from a deflected position in either direction toward its normal static load position with a continuously diminishing or decreasing resistance, said resistance approaching zero or some arbitrary minimum value at approximately the same rate that the vehicle body and spring would approach the normal static load position if their movement in this direction were critically damped.

Another object of this invention is to provide a shock absorber whose resistance to relative movements of axle and body are substantially independent of the speed of such movement.

Another object of this invention is to provide, in a shock absorber of the type described, means for automatically compensating for the effect of changes in the static load of the vehicle upon the operation of the device.

Another object of this invention is to provide, in a hydraulic shock absorber, having a fluid displacement chamber, a pressure operated outlet valve for said chamber, said valve being capable of being adjusted to maintain various degrees of pressure in said chamber, and, when once adjusted to maintain any particular pressure to be capable of maintaining said pressure constant, independent of the rate with which the volume of the said displacement chamber may be decreasing.

Another object of our invention is to provide a shock absorber which is capable of resisting compression movements of axle and body to the same extent that rebound movements are resisted, while at the same time preventing shocks from being transmitted through the shock absorber from the vehicle wheels to the body due to the wheels striking small bumps or ridges in the road surface while the shock absorber is resisting a down swing or compression movement of the body relative to the axle.

Further objects and advantages of the present invention will be apparent from the following description, reference being had to the accompanying drawings wherein a preferred embodiment of one form of the present invention and an alternative embodiment are clearly shown.

In the drawings:

Figure 3 is a fragmentary side view of the vehicle chassis, with wheels removed, a shock absorber equipped with the preferred form of the present invention being shown applied thereto.

Figure 4 is a fragmentary sectional view taken along the line 4—4 of Figure 1.

Figure 5 is an enlarged fragmentary sectional view of a portion of the valve adjustment control unit which is also shown in Figure 1.

Figure 6 is a fragmentary sectional view showing the internal construction of one of the two identical dashpots shown in Figure 2 and which form a part of the control mechanism.

Figure 7 is a fragmentary sectional view of the load change compensator shown in the alternative embodiment illustrated in Figure 2.

Figure 8 is a fragmentary sectional view taken along the line 8—8 of Figure 9 and Figure 9 is a fragmentary sectional view taken along the line 9—9 of Figure 8. Both of these figures illustrate one of the optional arrangements of the control mechanism to be described later. Figure 9 is drawn to twice the scale of Figure 8.

Figure 10 is a fragmentary sectional view taken along the line 10—10 of Figure 11 and Figure 11 is a fragmentary sectional view taken along the line 11—11 of Figure 10. Both of these figures illustrate another optional arrangement of the control mechanism to be described later.

Figures 12 and 13 are fragmentary sectional views showing portions of Figure 11 greatly enlarged and in different phases of operation.

Figure 1:
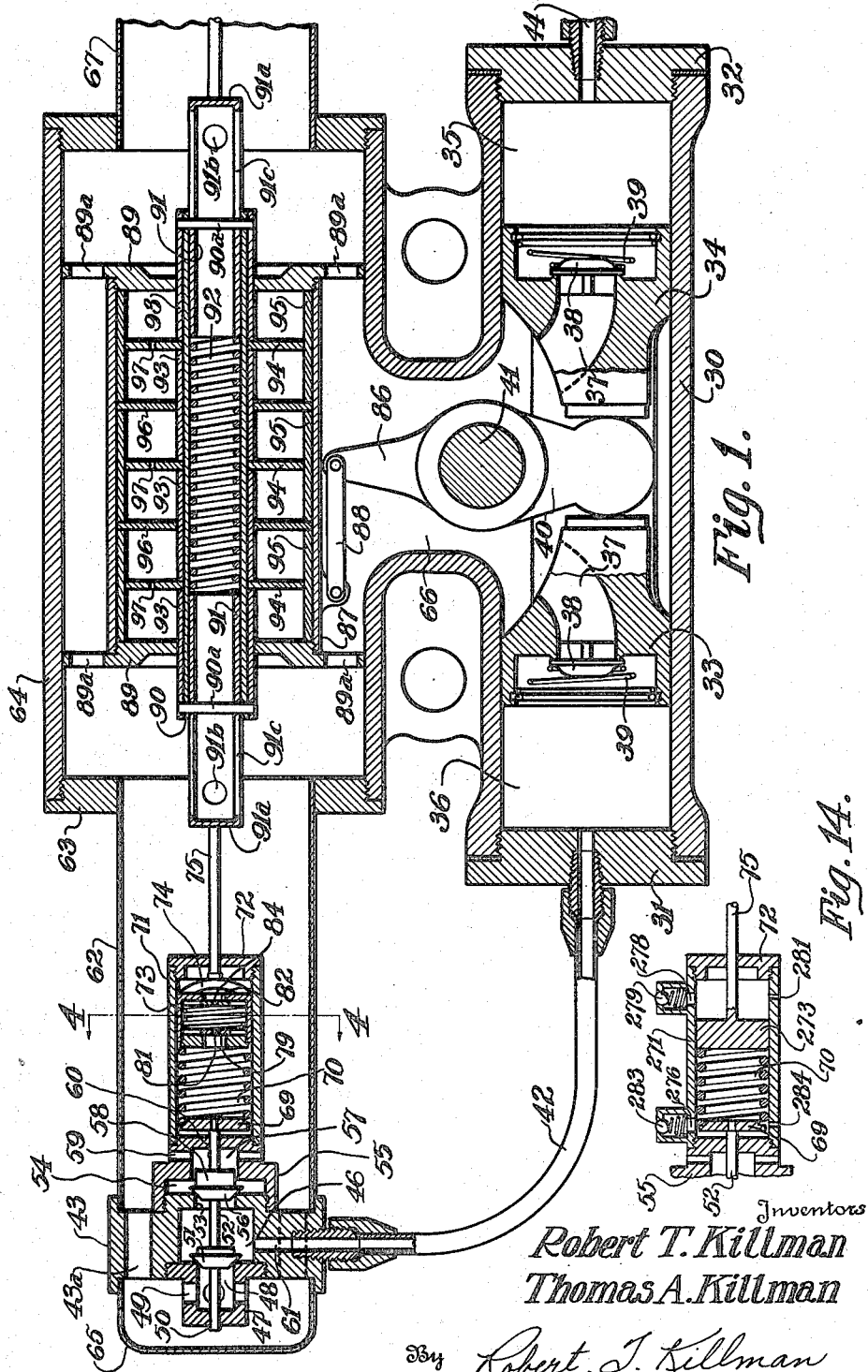
Figure 1 is a fragmentary longitudinal sectional view of a portion of the preferred form of the invention taken through the cylinder of the shock absorber, the load change adjuster, and one of the control means.

Figure 14 is a fragmentary sectional view of an alternative arrangement of the valve spring control dashpot shown in Figure 1.

The preferred embodiment of our invention will be described first.

Resistance unit

Referring to the drawings, and to Figure 3 in particular, the numeral 20 designates the frame of the vehicle which is supported upon a vehicle axle 21 by springs 22, one of which is shown. The shock absorber 23 is shown attached to the vehicle frame in any suitable manner, this shock absorber having an operating arm 24, the free end of which is swivelly secured to one end of a link 25, the opposite end of said link being swivelly attached to a bracket 26 anchored to the axle 21.

The shock absorber 23 has a casing providing a cylinder 30, (see Figure 1) opposite ends of which are closed by cylinder head caps 31 and 32 which are properly gasketed to prevent fluid leaks. Within this cylinder there is provided a piston having two piston head portions 33 and 34 forming two fluid displacement chambers 35 and 36, the chamber 35 being termed the "spring compression control chamber" and the chamber 36 the "spring rebound control chamber." Each head portion has a passage 37 in which a valveseat is provided and in each passage a check valve 38 is urged into normal engagement with the valve-seat to close the passage, by a comparatively light valve spring 39 mounted in the piston head in any suitable manner. These valves act as replenishing elements, being adapted to permit fluid to flow into their respective displacement chambers 35 and 36 in order to replenish said chambers for the fluid forced therefrom through the control valves, to be described later, and for any loss of fluid through leaks.

The piston is operated by a rocker lever 40 carried by and attached to the rocker shaft 41. This shaft is journalled in the casing 30, one end thereof extending outside the casing and having the shock absorber operating arm 24 secured thereto.

From the above description of the mechanism it will be seen that upward movement of the axle 21, toward frame 20, results in a counter-clockwise rotation of the arm 24 and consequently shaft 41 and rocker lever 40, resulting in a movement of the piston heads 33 and 34 toward the right as regards Figure 1. Due to this movement of the piston heads, any fluid within chamber 35 will have pressure exerted thereupon and will consequently be forced from said chamber through passages to be described later. At the same time fluid will be drawn into chamber 36 through the passage 37 and past check valve 38 in piston head 33. Due to the movement of the axle 21 toward frame 20, vehicle springs 22 will be compressed. In response to the rebounding movement of spring 22, that is, their return toward normal or static load position, the axle 21, moving away from frame 20 rotates arm 24 and therefore shaft 41 and rocker lever 40 in a clockwise direction, resulting in a movement of the piston heads 33 and 34 toward the left as regards Figure 1 and thus exerting a pressure upon the fluid in the rebound control chamber 36 to force the fluid therein from this chamber through passages to be described later. At the same time fluid is drawn into chamber 35 through the passage 37 and past the check valve 38 located in piston head 34.

The shock absorber is provided with ducts which connect chambers 35 and 36 with a fluid supply reservoir, whereby fluid is transferred from said chambers to said reservoir in response to piston movements back and forth. Fluid flow control devices are provided in said ducts to regulate fluid flow therethrough whereby the shock absorber is capable of resisting relative movements of axle 21 and frame 20 in either direction.

While we have illustrated and described in this preferred embodiment a certain specific type of resistance element it will be apparent that there exists a variety of resistance elements well known to those skilled in the art, which, for the purposes contemplated in this invention, may be fairly considered to be equivalent to the resistive element above described and herewith illustrated. Therefore it is to be understood that we are not to be limited to the specific type of resistive element shown and described but that this term shall be construed to include any or all such elements which may fairly be considered as equivalent thereto.

Returning now to Figure 1 a duct 42, shown as a pipe provided at its ends with suitable fittings, serves to connect the rebound control chamber 36 with the rebound control valve casing 43. A similar duct 44 connects the compression control chamber 35 with the compression control valve casing 45 (shown in Figure 3). Since the rebound control valve and the compression control valve and all of their associated parts are identical in general structure, only the rebound control valve has been shown in Figure 1 and will be described in detail. The arrangement of the complete mechanism will be apparent from Figure 3.

Resistance control valves

Before describing the control valves and their operation, it will be well to enumerate the characteristics necessary in the valves used in this device. In order to accomplish the objects previously stated, it is necessary that the resistance which the shock absorber imposes to relative movement of the axle 21 and the frame 20 be under close control, and also that this resistance be independent of the speed of said relative movement. Translating these requirements into terms of control valve characteristics, the control valves must be capable of being adjusted so as to maintain any desired pressure (within limits) in their respective displacement chambers (provided, of course, that the volume of said chamber is diminishing at a sufficient rate to overcome any leaks which may be in the system) and to maintain this pressure independent of the rate at which the volume of the chamber is diminishing (subject to the above provision) or in other words independent of the amount of fluid being forced through the valve in a given time.

The fluid flow control valve of this invention is a spring loaded pressure operated valve and in order that a fairly small and weak spring may control the very high pressures which exist at times in the displacement chambers, we prefer to use a differential valve. By differential valve is meant a valve having two discharge openings with valve members cooperating with each opening. The opening and the valve members are so arranged that the internal pressure is directed against one valve member in a direction to close the opening but is directed against the other member in a direction to move it from its seat and open the valve. The valve members are joined by a stem so that the forces applied to one valve member oppose the forces applied to the other member. By making one or the other of the members larger than the other, thus exposing more surface to the pressure, the force upon that valve may be caused to exceed that exerted upon the other smaller member by a certain differential and the valve as a whole may be given a tendency to open or to close under pressure, depending upon which valve member is the larger. The amount of the difference in the two opposing forces or the tendency the valve has to open or to close under a certain pressure depends upon the difference in the effective size of the two valve members.

In our invention we prefer to make the valve member against which the pressure is exerted in a direction to open the valve slightly larger than the other member so that the valve as a whole has a tendency to open under pressure. This tendency to open is opposed by a spring, the tension of which may be adjusted from zero to some larger limit. Thus the valve may, by adjusting the pressure which the spring exerts, be adjusted to remain closed until some predetermined pressure has been built up and then to open and allow fluid to flow therethrough.

It is very desirable in a valve of this type and in one used for this purpose, that, having once been adjusted to open at a certain predetermined pressure, it will open sufficiently to allow the fluid to pass therethrough just fast enough to relieve the pressure so it will neither rise further nor fall from the value at which the valve was set to open, and, if the rate of fluid flow therethrough be increased the valve will open wider to accommodate such increased flow without causing the pressure to rise or fall.

We have discovered by actual experiment that in a valve constructed as above described, such is not the case. The valve being set to open at a predetermined pressure will do so, but any increase in fluid flow therethrough will cause the pressure to rise. The valve acts as it opens wider and wider as if it were losing its differential or if the difference in size between the two valve members was steadily growing less. Of course some of this increase is due to the rate of the valve spring, but we have found that this factor accounts for a very negligible part of the increase in pressure. We have overcome such irregularity of the valve by the addition of a loose fitting piston and cylinder into which the larger of the two valve openings discharge. We have also discovered that a well fitting bearing such as a valve stem, a close fitting piston and cylinder etc., when operating under high fluid pressure applied to one end only of said bearing tend to develop a very great amount of friction which militates against the accurate operation of the control valve. Accordingly we have placed the valve stem bearings where they are not subjected to the high pressures of the displacement chamber and by making the piston above referred to very loose fitting and also not subject to displacement chamber pressure.

Referring now to Figure 1 the rebound control valve casing 43 (the compression control valve casing 45 being identical) is provided with the centrally located cylindrical cavity 46. Threadedly engaging and closing one end of the cavity 46 is the cap 47 provided with the valve passage 48 with which communicate the ports 49 and the valve stem bearing hole 50. Within the cavity 46 and normally closing passage 48 is located valve member 51 rigidly mounted upon valve stem 52. A valve passage 53 opens from the other end of cavity 46 into a closed chamber 54 formed in cap 55 which threadedly engages the rebound control valve casing 43. Located in chamber 54 and rigidly affixed to valve stem 52 is the valve member 56 which normally closes passage 53. A cylindrical chamber 57 is formed in cap 55 and communicating therewith are ports 59 and valve stem bearing hole 60. Extending and fitting loosely into the cylindrical chamber 57 and rigidly attached to the valve stem 52 is the piston 58.

The size of the piston 58 relative to the effective size of the valve member 56, and to the internal diameter of the cylinder 57 is of great importance. We have found that for optimum results the diameter of piston 58 must be slightly greater than the effective diameter of the valve member 56 and that the internal diameter of cylinder 57 must be slightly larger than the diameter of piston 58. As an example, intended to be merely illustrative and in no way restrictive, we have made use of a valve in which the dimensions were as follows: The effective diameter of valve member 51 was 0.475 inch, the effective diameter of valve member 56 was 0.500 inch, the actual diameter of the piston 58 was 0.510 inch, and the internal diameter of the cylinder 57 was 0.514 inch. The actual values are however dependent upon a great many variable factors and must be determined by experiment in any given case.

By the terms "effective diameter" and "effective area", in connection with the valve members, is meant the area, or the diameter of the area, of the valve member against which the fluid pressure within the cavity 46 is effective in exerting a force against said member to move it or to tend to move it.

Valve stem 52 carrying valve members 51 and 56 and piston 58 is arranged to slide longitudinally in its bearings 50 and 60, and valve members 51 and 56 are so spaced thereon that they close their respective passages simultaneously.

Mounted upon the end of valve stem 52 nearest the piston 58 is the circular platform 69 against which the valve spring 70 bears. This platform also serves the additional purpose of acting as a damping piston or paddle to damp out any tendency of the valve mechanism to chatter or vibrate longitudinally.

A port connects duct 42 with the cavity 46.

The casing 43 is mounted upon the end of the supporting tube 62 which in turn is mounted in the cap 63 which threadedly engages the end of a cylinder 64 which is provided in the shock absorber casing and has its longitudinal axis parallel to the axis of cylinder 30, cylinder 64 communicating with cylinder 30 by means of passage 66. The other end of the rebound control valve casing 43 is closed by the cap 65 mounted thereon in any suitable manner. Holes 43a formed in the rebound control valve casing 43 provide for fluid flow from the space interior of cap 65 to the space within the support tube 62.

The compression control valve casing 45 is similarly constructed and supported upon a support tube 67 and closed by a cap 68. The open space within the tube 62, the cylinder 64, the tube 67, the passage 66, and the space between the piston heads 33 and 34 serves as a reservoir for fluid from which the displacement chambers 35 and 36 are replenished through passages 37 and check valves 38, and into which the fluid ejected from the displacement chambers is discharged through the control valves.

The complete path of fluid through the rebound control chamber is as follows: When the piston moves to the right the volume of the rebound control chamber 36 increases and fluid is drawn from the reservoir through passage 37 and past the check valve 38 in the piston head 33 thus keeping the rebound control chamber 36 filled with fluid. Upon completion of the movement of the piston to the right the check valve 38 will close and as the movement of the piston to the left begins, the entrapped fluid will be ejected from the rebound control chamber 36, through the ducts 42 and 61 into the cavity 46 within the rebound control valve casing 43. Upon reaching whatever predetermined pressure at which the rebound control valve has been set to open, the force exerted by the fluid pressure acting upon the differential in the effective areas of valve members 51 and 56 will cause both members to move away from their seats against the tension of the valve spring 70 and a portion of the fluid will pass between valve member 51 and its seat, through passage 48, and openings 49 into the cap 65, thence through openings 43a into tube 62 which is part of the reservoir as previously explained. The other portion of fluid contained in the cavity 46 will pass through passage 53, then between valve member 56 and its seat into the closed chamber 54, thence around the piston 58, between it and the interior of the cylindrical chamber 57 and out through openings 59 to the reservoir as represented by tube 62.

It is the function of the rebound control valve to resist the passage of fluid therethrough, as it is ejected from the rebound control chamber 36, sufficiently to maintain within chamber 36 some predetermined pressure (which pressure will be determined by the force with which valve spring 70 is set to bear against the valve spring platform 69) and therefore a predetermined resistance to the piston travel toward the left (in Figure 1) and therefore to the separation of axle 21 and frame 20.

It is necessary to the proper functioning of the device that the control valve be able to maintain the pressure within the rebound (or compression) chamber to the value for which it has been adjusted regardless of whether the movement of the piston be just sufficient to overcome any leaks in the system and bring the pressure up to the predetermined value, or whether the piston is moving at the highest speed it will ever be called upon to move, due for example to the vehicle wheel striking an abrupt obstacle at high speed. This will prevent sudden shocks due to obstructions in the road surface from being transmitted through the shock absorber from the axle 21 to the frame 20.

The action of the rebound control valve (the compression control valve action being identical) in fulfilling this requirement is as follows: Assume valve spring 70 to be set (by a mechanism to be described later) so that the rebound control valve will open at a certain predetermined fluid pressure and assume the piston head 33 to be moving to the left (Figure 1) at a speed just sufficient to cause the valve members 51 and 56 to just leave their valve seats and allow a small flow of fluid therethrough. We will assume that under these conditions the fluid pressure within the rebound control chamber 36 and the cavity 46 is the required predetermined pressure. Suppose that the velocity of piston travel be now doubled. This will cause the fluid flow through the control valve to be doubled, and, in order for the same predetermined pressure to be maintained in chamber 36 and cavity 46 the area of the opening by which the fluid passes through the control valve must be doubled. Since the opening is directly proportional to the distance the valve members move away from their seats, it is necessary in order to accommodate the doubled flow and still maintain the predetermined pressure, that the valve members move away from their respective valve seats to a point double the previous distance. The same proportionality must obtain for any increase in piston speed.

We have found by experiment that the valve members unaided do not maintain this proportionality i. e., if the flow be doubled they do not move to a point double the previous distance from the valve seat, but to a point somewhat less than twice the previous distance, thus causing the fluid pressure to rise above the predetermined value.

In the control valve of the present invention the fluid escaping through passage 53 past valve member 56 is entrapped within the substantially closed chamber 54. In order to escape therefrom the fluid must pass through the clearance space between the piston 58 and the internal surface of the cylinder 57. The fluid entrapped in chamber 54 exerts a force against the piston 58 urging it to the right (Figure 1) thus tending to move the valve members, which are attached to valve stem 52 along with piston 58, further from their seats and thus accommodate the increased flow without causing the pressure to rise. Since the piston 58 has a larger effective area than the valve member 56 it will be seen that any given fluid pressure in chamber 54 will exert a greater force upon piston 58 than an equal fluid pressure in cavity 46 will exert upon valve member 56. Also, since the clearance or leak around piston 58 remains constant however far to the right valve stem 52 moves, while the valve opening past valve member 56 becomes greater with every such movement, it will be seen that the pressure in chamber 54 will rise with every increase in valve opening, approaching the pressure in cavity 46 as a limit, and thus becomes increasingly effective against piston 58 to compensate for the deficiency of force against valve member 56. In short, as the valve assembly opens wider and wider to accommodate increased fluid flow, the apparent loss of "differential" observed by experiment, is compensated for by the gradual addition of the differential between piston 58 and valve member 56 to the normal differential existing between valve members 51 and 56. Piston 58 becomes effective only after valve member 56 has moved from its seat and becomes increasingly effective with an increase in said movement.

By properly proportioning the various parts, we have found it possible to construct a valve as described which will maintain the pressure constant within practical limits under the conditions of normal operation of the shock absorber. If the piston 58 be made too large or the clearance between it and the cylinder 57 be too small the valve tends to open too far and the pressure and hence the resistance will fall upon an increase in the rate of fluid flow. In proportioning these parts it will be found that the difference in size between piston 58 and valve member 56 will determine the force which may be added to assist the valve to open, while the size of the clearance between piston 58 and cylinder 57 will determine the rate at which the force is increased as the valve is opened further and further.

Valve adjustment control unit

It will be seen from the foregoing that the resistance offered to relative movements of the axle 21 and the frame 20 in the rebound or separative direction depends upon how much force the valve spring 70 exerts against the valve spring platform 69 (or to the force of the corresponding valve spring associated with the compression control valve for relative movements in the compressive or approaching direction). Therefore, to change the resistance to relative movements of axle 21 and frame 20 it is only necessary to adjust the compression of the appropriate control valve spring. The mechanism by which this is accomplished in accord with the relative movement of axle and frame is termed the valve adjustment control unit.

The mechanism will be described in connection with the rebound control valve, it being understood that a similar mechanism (not shown in Figure 1) is provided for controlling the adjustment of the compression control valve.

The valve spring 70 is enclosed within a cylinder 71 which threadedly engages the cap 55 and which is closed at its other end by the threaded plug 72. Slidably mounted within cylinder 71 is the close fitting cup-shaped piston 73, attached by the yoke 74 to the piston rod 75 which is slidable in a close fitting bearing in plug 72.

The construction of the piston 73 and its associated members is best seen in Figure 5. The end wall of the piston is pierced by the opening 76 and the open end of the piston 73 is closed by the plate 77 which is pierced by the opening 78. Acting as a check valve and closing the opening 78 is the valve plate 79, centrally located over opening 78 by the three radial fingers 80 which fit inside piston 73 loosely (see Figure 4 also). Valve plate 79 is pierced by the small orifice 81. A similar valve plate 82 having three radial positioning fingers 83 and pierced by the orifice 84 closes the opening 76. A light coil spring 85 bearing at one end against fingers 80 and at the other end against fingers 83 normally urges plates 79 and 82 to close openings 78 and 76 respectively. The orifices 81 and 84 are used as restrictions to fluid flow.

The cylinder 71 is immersed in the fluid contained in the reservoir and is designed to operate completely filled with fluid. From the above description it will be seen that if piston 73 (Figures 1 and 5) is moved toward the left by means of piston rod 75, the control valve spring 70 will be compressed and will bear harder against spring platform 69 thus adjusting the rebound control valve for higher fluid pressure. At the same time the fluid contained in the left end of cylinder 71 will force plate 79 from its seat, against the tension of the spring 85 (provided orifice 81 will not accommodate the flow) and will be forced to pass through orifice 84 to the right hand end of cylinder 71, since plate 82 closes the opening 76. Therefore, in moving to the left the piston 73 is resisted not only by the valve spring 70 but also by the fluid entrapped in the left hand end of cylinder 71 which must pass through the restrictive orifice 84 before piston 73 may move to the left. This last resistance depends upon the size of the orifice 84, being greater as the size of orifice 84 is reduced, and upon the speed with which piston 73 moves to the left, becoming greater with an increase of piston speed.

Suppose piston 73 to have been moved a short distance to the left and then released. The force stored up in valve spring 70 will return piston 73 to its original position, moving it to the right. During this movement the fluid entrapped in the right hand end of cylinder 71 will force valve plate 82 from its seat, and will pass through orifice 81 in valve plate 79, which is now forced against its seat. In passing through orifice 81 the fluid will encounter resistance, and will resist the efforts of valve spring 70 to move piston 73 to the right. By properly proportioning orifice 81, the time of return to the right may be made as slow as desired, and by properly proportioning orifice 84 the resistance to movement to the left for any speed may be regulated.

An alternative construction of the mechanism just described is shown in Figure 14. In this figure the numeral 271 denotes the cylinder in which the valve spring 70 is enclosed. A solid piston 273, attached to the piston rod 75 passing through the plug 72, operates within the cylinder 270 and abuts one end of the valve spring 70. At the end of cylinder 271 nearest the cap member 55 is provided the opening 276 which is normally closed by the inwardly opening ball check valve 283. At the same end of cylinder 271 a small orifice 284 is provided. At the opposite end of cylinder 271 is provided the small orifice 281 and the inwardly opening ball check valve 279 normally closing passage 278.

It will be seen that if piston 273 is moved to the left to compress valve spring 70 fluid contained in the left hand end of cylinder 271 will be forced out therefrom through orifice 284 into the fluid reservoir, since ball check valve 283 closes passage 276 under pressure from within the cylinder. At the same time fluid will be drawn from the reservoir into the right hand end of cylinder 271 past check valve 279 through passage 278. A small amount will also be drawn in through orifice 281. Thus, in moving to the left, the piston 273 is resisted not only by the valve spring 70 but also by the fluid entrapped in the left hand end of cylinder 271 which must pass through the restrictive orifice 284 before piston 273 may move to the left. This last resistance depends upon the size of orifice 284, being greater as the size of orifice 284 is reduced, and upon the speed with which piston 273 moves to the left, becoming greater with an increase of piston speed.

Suppose piston 273 to have been moved a short distance to the left and then released. The force stored up in valve spring 70 will return piston 273 to its original position, moving it to the right. During this movement the fluid entrapped in the right hand end of cylinder 271 will be forced through the restrictive orifice 281 since ball check valve 279 closes passage 278 under pressure within cylinder 271. At the same time fluid will be drawn from the reservoir past check valve 283 through passage 276 into the left hand end of cylinder 271. The forcing of fluid through the restrictive orifice 281 resists the efforts of valve spring 70 to move piston 273 to the right. By properly proportioning orifice 281, the time of return of piston 273 to the right to its normal position may be made as slow as desired, and by properly proportioning orfice 284 the resistance to movement to the left for any given speed may be regulated.

The mechanism by which piston 73 (or piston 273 in the alternative form of construction) associated with the rebound control valve and the similar piston associated with the compression control valve are moved so as to compress their respective valve springs and thus adjust the control valves in consonance with relative movements of axle 21 and frame 20 is contained within the upper cylinder 64 and passage 66. Extending upward from and rigidly affixed to the rocker shaft 41 is the operating arm 86 connected to the cylindrical casing 87 by the link 88. Casing 87 is closed at each end by threaded plugs 89 which are enlarged and have a sliding bearing within cylinder 64. Apertures 89a are provided to allow free fluid circulation. Slidably mounted in plugs 89 and coupled to them and to casing 87 by means which will be termed the load change compensating means and which will be described later is the tubular member 90, slidably mounted within which at each end thereof are the tubular pusher members 91 having closed ends 91a, pressure relief apertures 91b, and longitudinal slots 91c, through which passes the rivets or pins 90a, in such manner that pusher members 91 are capable of a limited sliding movement within tubular member 90, the limit to such motion being the engagement of pins 90a with the ends of slots 91c. Lying between and abutting the inner ends of pusher members 91 and within tubular member 90 is the pusher spring 92 which normally maintains pusher members 91 projecting from the ends of tubular member 90 to the limit of their movement but when in this position exerts no force against them.

From the above it will be seen that a relative movement of axle 21 and frame 20 in the rebound or separative direction, acting through link 25 and arm 24 to cause shaft 41 to rotate in a clockwise direction and move the shock absorber piston heads 33 and 34 to the left (see Figure 1) will also act through arm 86 attached to shaft 41, and link 88 to move casing 87 and its end plugs 89 to the right or toward the compression control valve, the circumferential surfaces of plugs 89 sliding along the inner surface of cylinder 64, and the displaced fluid circulating through openings 89a. Similarly a relative approaching movement of axle 21 and frame 20 causing a counter-clockwise rotation of shaft 41 and a movement of the shock absorber piston heads 33 and 34 to the right, will cause casing 87 to be moved to the left or toward the rebound control valve.

In order to better understand the action of this portion of the invention, assume for the moment that the tubular member 90 is held rigidly in position in the plugs 89 carried by casing 87, and that casing 87, due to a relative movement of axle 21 and frame 20 in the approaching direction, i. e., in the direction to compress the vehicle springs 22, is being moved to the left (Figure 1) toward the rebound control valve. Suppose now that the end face 91a of the left hand pusher member 91 which is being carried along by this movement encounters some object, such as for example the end of piston rod 75 which we shall assume offers resistance to the further movement of member 91 in this direction. The movement of member 91 to the left will be slowed down or may even be stopped entirely, depending upon the resistance encountered. Tubular member 90 will therefore telescope pusher member 91 to some extent depending upon how much the movement of member 91 has been curtailed, pin 90a sliding in slot 91c and pusher spring 92 being compressed between the inner ends of pusher member 91. Entrapped fluid will escape through slots 91c and openings 91b. The greater the resistance encountered and the greater the distance of travel of casing 87, the greater pusher spring 92 will be compressed.

The resistance which piston rod 75 offers to this movement of pusher member 91 is due to the valve spring 70 and to the passage of fluid entrapped in front of piston 73 through the orifice 84. If the movement of the casing 87 is very slow the fluid will have ample time to pass through orifice 84 and the only resistance encountered will be offered by valve spring 70 which will be compressed to an extent depending upon the relative rates of valve spring 70 and pusher spring 92 and also the distance casing 87 moves. The amount that valve spring 70 is compressed is, of course, the important thing, since the amount of its compression determines what fluid pressure in the rebound control chamber 36 will be required to open the rebound control valve, or in other words the amount of resistance the shock absorber will offer to the relative movement of axle 21 and frame 20 in the rebound or separative direction.

It is, of course, to be understood that the relative motion of axle 21 and frame 20 is an irregular oscillatory or reciprocating movement made up of the very irregular up and down movements of the axle 21 as the wheels follow the irregular road surface and the more or less harmonic motions of the vehicle body and frame acting as a free, spring suspended mass. The movements of casing 87 within cylinder 64 will therefore be a reciprocatory motion, following the relative movements of axle 21 and frame 20. However, in order to better describe the function of the piston 73 and how it affects the adjustment of the rebound control valve (and also how the similar mechanism associated with the compression control valve affects the adjustments of that valve) we will assume casing 87 to be executing a harmonic reciprocatory motion back and forth within cylinder 64, and describe the effect of a single half cycle of this movement upon the adjustment of the rebound control valve.

If the amplitude of the harmonic motion executed by casing 87 is held constant and the frequency of oscillation varied, the amount of compression of valve spring 70 brought about by the above mentioned half cycle of movement will be a function of the frequency. If the frequency is low the fluid will have time to pass through orifice 84 and the valve spring will be compressed a relatively large amount. With an increase in frequency the entrapped fluid has less time to escape and the piston 73 offers more resistance to movement and the valve spring 70 is protected in some degree thereby, pusher spring 92 being forced to absorb the difference, so that valve spring 70 will be compressed less and pusher spring 92 more than in the previous movement of lower frequency. As the frequency of oscillation is raised higher and higher, the valve spring 70 will be compressed less and less and the pusher spring 92 more and more until a point is reached where the movements of casing 87 reach a frequency which approximates that which it would have if the vehicle were driven over a road surface having small, closely spaced obstacles, at very high speed, and where, according to the proportions we prefer to use for the various parts described, the compression of valve spring 70 will be negligible, pusher spring 92 having absorbed the whole movement.

At the other end of the frequency scale we prefer (though we do not desire to be restricted thereto) to so proportion the various parts that, assuming an oscillation of casing 87 at the same frequency as that of the vehicle body, frame, etc. vibrating at its natural frequency upon the vehicle springs, the amount spring 70 is compressed by a half-cycle of oscillation of casing 87 will adjust the rebound control valve so that the resistance the shock absorber offers to the rebound movement will be just slightly less than the force stored up in the vehicle spring 22 at the moment said rebound begins.

As casing 87 moves to the right, after having caused valve spring 70 to be compressed, end face 91a will remain in contact with the end of piston rod 75, pusher member 91 emerging from within tubular member 90, until pin 90a reaches the end of slot 91c whereupon end face 91a will leave the end of piston rod 75. Due to the force stored up in valve spring 70 by its compression, piston 73 will be moved to the right, and the time required for piston 73 to move to the point where no compression remains in valve spring 70, and therefore no force is exerted against spring platform 69, will be determined by the size of the orifice 81 which restricts the entrapped fluid in its passage from right to left through the piston 73. We prefer, although we do not desire to be limited thereby, to proportion the various parts so that the time required for piston 73 to move from any given point where valve spring 70 is compressed to the point where valve spring 70 is not compressed, will be substantially the same as the time that would be required for the vehicle body and frame 20 to return from a displaced position relative to the axle 21 back to the normal static load position, if this movement were critically damped, said displaced position being the position the frame 20 would occupy relative to axle 21 at the end of the relative movement of the two which resulted in piston 73 being moved by casing 87, pusher 91, spring 92 etc. to occupy the given position, and assuming the movement to have been slow enough that the effect of orifice 81 in restricting the movement to have been negligible.

The normal relative positions of the parts of the control valves and the valve adjustment control unit, assuming the frame 20 and axle 21 to be in their normal static load position and the vehicle to be at rest, is as follows: Valve members 51 and 56 close their respective valve seats but bear thereagainst with negligible pressure, valve spring 70 lies between valve spring platform 69 and piston 73, being at zero compression (the term zero compression being understood to include, if desirable, a relatively small minimum pre-set compression of spring 70 in order that the shock absorber may, if desired, always offer a relatively small minimum resistance to body and axle movements for the purpose of stabilization), left hand pusher member 91 is fully extended from tubular member 90 to the limit of slot 91c, and just touches the end of the piston rod 75 associated with the rebound control valve, pusher spring 92 lies between the two pusher members 91 being uncompressed thereby, right hand pusher member 91 just touches the end of the piston rod associated with the compression control valve, and the compression control valve and its associated mechanism is arranged in a manner similar to that just described for the rebound control valve.

In some cases it has been found desirable to prevent the end face 91a from continuing to bear against the end of piston rod 75 as the casing 87 moves to the right after having caused the rebound control valve spring 70 to be compressed (or as it moves to the left in the case of the compression control valve spring) in order that piston 73 will not be hindered in its return movement (the decompression of valve spring 70) by any force other than that due to the fluid entrapped in the right hand end of cylinder 71, and therefore the time consumed by this decompression movement may be more accurately predetermined.

In order to accomplish this purpose we have provided two optional structures which may be made use of instead of the valve adjustment mechanism shown in Figure 1.

The first of these optional structures is shown in Figures 8 and 9 and comprises, briefly, a fluid pressure operated clutch or chuck which, when operated by fluid pressure in the rebound control chamber 36, as piston head 33 moves to the left and casing 87 moves to the right, serves to lock pusher member 91 within tubular member 90 so that member 91 is prevented from sliding out therefrom and thus holding pusher spring 92 compressed and preventing face 91a from bearing against piston rod 75 as casing 87 returns from left to right to its normal central position. With a reverse movement of casing 87 the pressure in chamber 36 is, of course, eliminated and the clutch releases member 91 which is then free to slide as previously described in connection with Figure 1. A similar clutch is, of course, provided for holding the right hand pusher member 91 and it operates in like manner.

Referring to Figures 8 and 9 the sleeve 93 is provided at one end with the enlargement 93b through which pusher member 91 slides. Four radial cylinders are provided in enlargement 93b in which the four piston members 93c operate. A cover ring 93a cooperates with a circumferential groove formed in enlargement 93 and communicating with each of the four cylinders, to form the annular space 93e, with which communicates one end of the helically coiled tube 61a. This tube, which is coiled to provide sufficient flexibility to allow for the proper movement of member 93, connects at its other end with the duct 61 in rebound control valve casing 43. Light springs 93d maintain pistons 93c in contact with the surface of pusher member 91.

From the above it will be seen that fluid pressure in rebound control chamber 36 will be communicated by ducts 61 and tube 61a to the annular space 93e where it will act upon pistons 93c causing them to grip member 91. The total area of the pistons and the arrangement of other parts is made such that a comparatively low fluid pressure is required to prevent relative movement of members 90 (to which member 93 is rigidly fixed) and member 91 under the influence of spring 92.

The second optional structure which we have provided for the above purpose is illustrated in Figures 10, 11, 12 and 13. Casing 87 which is movable by means of link 88 and arm 86, is provided with end plugs 289b which are slidable upon sleeves 93 which in turn are rigidly affixed upon tubular member 290. Circular plates 289, provided with fluid apertures 289a, are also fixed upon tubular member 290 and thus provide a slidable support for the assembly within the cylindrical casing 64. Located within and rigidly affixed to tubular member 290 near the ends thereof are the tubular sleeves 290b, slidable within which are the pusher members 291 being provided near their inner ends with the encircling rigidly affixed sleeves 291c which slide within tubular member 290. Pusher member 291 is provided with a face 291a for contacting piston rod 75 and fluid escape openings 291b. Tubular member 290 is provided with a centrally located partition 290d, on either side of which and within member 290 lie the pusher springs 292R and 292C with their ends abutting the inner ends of pusher members 291.

From the above it will be seen that if the left hand pusher member 291 is moved to the right relative to tubular member 290 an annular space 291d will be formed between the ends of sleeves 290b and 291c, within member 290 and around member 291. Apertures 290c formed in tubular member 290 provide access to this space, and thus it will be seen that, if these apertures are unobstructed, the above movement will cause fluid to be drawn into said space 291d. Upon the return movement of pusher member 291 to the left under the influence of pusher spring 292R the fluid contained in this space 291d will be evacuated through opening 290c. If opening 290c be closed the fluid is trapped in the said space and the pusher spring will be unable to return pusher member 291 to the left.

In order to control the opening and closing of aperture 290c, a sleeve valve member 288, having limited sliding movement between stop ring 290a and circular member 289 upon member 290. A slot 288a is provided in sleeve valve member 288 in such position that when the sleeve valve member 288 occupies the position adjacent member 289, the slot 288a is aligned with aperture 290c thus providing free fluid passage into or out of the space 291d. When sleeve 288 occupies the position adjacent the stop ring 290a a portion of the sleeve covers and closes apertures 290c. Figure 12 shows the openings in the aligned position and with member 291 occupying its normal position. Figure 13 shows the passages closed and member 291 in its displaced position. Here the fluid is entrapped in the space 291d and the pusher spring 292R is held compressed.

Means for operating the slide valve 288 is provided as follows. The circular members 289 are provided with boxlike projections 283 (see Figures 10 and 11). Carried within these projections and pressed against the interior surface of casing 64 by the springs 282 are the friction shoe members 285 provided with friction surfaces 281. An extension to member 285 passes through an opening in plate 289 and is pivotally attached to the lever 287 which in turn is pivoted at one end to sleeve valve 288 and at the other end to the projection 286 carried by plate 289. Friction member 285 is allowed a limited longitudinal motion within the box member 283, in such manner that it may lag slightly behind the longitudinal movements of members 289 and 283 due to its friction upon the inner surface of casing 64.

The operation of the structure just described is as follows. Suppose the tubular member 290 to be moving to the left, due to an approaching movement of the axle and frame of the vehicle. Friction shoes 284 will lag behind and will cause the valve sleeves 288 to occupy their furtherest right hand positions (as shown in Figures 11 and 12) i. e. the left hand sleeve valve 288 will be open while the right hand sleeve valve 288 will be closed. As the movement of pusher member 291 is resisted by piston rod 75 it will be forced further into tubular member 290, enlarging the space 291d and drawing fluid thereinto through openings 288a and 290c. Fluid entrapped within pusher 291 escapes through openings 291b. Upon completion of the movement of the assembly to the left and the beginning of the return movement to the right, the friction shoes 284 will again lag behind and cause levers 287 to move sleeve valves 288 to their left hand positions. Thus the left hand valve will close and the right hand valve will open. Fluid entrapped in space 291d by the closing of valve 288 will prevent member 291 from being pushed out of member 290 by spring 292R, as the movement to the right takes place and the face 291a is prevented from bearing against the end of piston rod 75 during this movement. When the movement again reverses the left hand valve will be opened and the right hand valve closed. The fluid entrapped in space 291d will be ejected and member 291 forced to its normal position by spring 292R. It is of course, understood that the other valve and its associated parts operate in similar manner. The partition 290d serves to isolate the pusher springs so that the compression of one spring will have no effect upon the other spring.

*Static load change compensating mechanism*

For simplicity of description, it was assumed above that the tubular member 90 in Figure 1 was held rigidly to occupy a fixed position relative to casing 87 and its end plugs 89. Such is not strictly the case. If it were, the above described normal relative positions of the parts of the control valve and the valve adjustment control unit as described above, would not hold true except for a given static load. If passengers were to get into or out of the vehicle or the static load on the vehicle springs 22 altered in any way the relative static load positions of axle 21 and frame 20 would be shifted. In order to allow for this shift in the static load position and maintain the proper position of the control valves and their associated valve adjustment control unit, and at the same time maintain an operative connection between them, the mechanism termed the static load change compensating mechanism is employed. Briefly it consists in a relatively slow, double acting dash pot connecting tubular member 90 to casing 87 and its end plugs 89 so that member 90 is capable of longitudinal sliding movement therein, said movement being resisted in either direction by the dashpot. For the purpose of maintaining a low dashpot fluid pressure we prefer to use a plurality of dashpots working in parallel or in tandem. In the preferred embodiment of our invention we make use of three dashpots. It is of course obvious that a single dashpot having sufficient piston area may be used. We prefer to keep the fluid pressure within the dashpot always less than atmospheric pressure in order to eliminate the deleterious effect of leaks. If fluid were forced out of the dashpot through a leak by pressure higher than atmospheric pressure in one end of the dashpot a vacuum would eventually be formed within the dashpot since the atmospheric pressure could not force fluid in through the leak as fast as it was forced out due to the high pressures. If pressures within the dashpot are kept less than atmospheric pressure the fluid will not be forced out of any leaks faster than it can be returned by atmospheric pressure.

The construction of the dashpots in the preferred embodiment of the present invention is as follows: Closely fitting around the tubular member 90 are the four tubular sleeves 93 held in place thereon by pins 90a and clamping between their adjacent ends the three dashpot piston plates 94, which fit slidably within the three sleeve members 95 which fit within the casing 87 and are clamped between the end plugs 89 and clamping between their adjacent ends the two partition plates 96 which in turn have apertures at their centers which form a sliding fit upon sleeves 93. Small orifices 97 are provided through piston plates 94 to allow a very restricted fluid flow therethrough. In some cases these orifices may be dispensed with and use made of the inherent leaks within the system to provide for said fluid flow.

From the above it will be seen that the end plugs 89, sleeves 95, and partition plates 96 form three dashpot chambers rigidly attached to casing 87, and that piston plates 94, sleeves 93 and the tubular member 90 form a triple piston assembly slidable within said dashpot chambers to displace fluid contained in said chambers from one end of each chamber to the other end of said chamber through orifices 97. The resistance that the fluid encounters in passing through these orifices acts to resist any relative movement in either direction of casing 87 and tubular member 90 but will allow such movement to take place slowly. If a change is made in the static load carried by the vehicle, shaft 41 will be rotated either clockwise or counter-clockwise depending upon whether the load is decreased or increased. Casing 87 will be moved either to the right or left from its central position carrying with it tubular member 90 and its attached parts. This movement causes a compression of one or the other valve spring and of pusher spring 92. Since the displacement of casing 87 due to a load change is more or less permanent (as compared to the rapid displacements due to rough roads) the compression of these springs will act against the load change compensating dashpots to move tubular member 90 relative to casing 87 and return it to its normal central position, thus compensating for the effects of the change in load. The action of the load compensating dashpots is made so slow that they are not appreciably affected by the relatively rapid displacements of casing 87 due to relative movements of axle 21 and frame 20 caused by rough roads.

Having described in detail the construction and operation of each of the separate elements we will now describe the action of the preferred form of our invention as a complete mechanism attached to a vehicle.

*Operation of preferred embodiment*

It will be realized that, in passing over a road surface, the wheels of a vehicle encounter an endless variety of shapes and sizes and groupings of obstacles, and that they do so at an endless variety of speeds. We shall therefore confine this explanation of the action of the shock absorber of our invention in controlling body and axle movements to a few representative cases.

Let us assume that the road wheels of the vehicle meet with a symmetrical obstacle as for instance a hump whose front and back surfaces are identical. Disregarding for the moment the effect of the shock absorber it will be found that the effect upon the car body of such an encounter will depend very largely upon the vehicle speed at the time of the encounter. If this speed be very low the body will be lifted up and over the hump by the springs with so little acceleration that there will be practically no relative movement of frame and axle i. e. no compression of and no energy stored up in the vehicle springs. On the other hand if the speed be exceedingly high, the wheels will move up and down over the hump without the body having time to change from its normal smooth horizontal motion due to its inertia. In this case there was a maximum relative movement (for this particular hump) of frame and axle and a maximum energy absorbed by the vehicle springs, but the energy was practically all returned to the axle, the amount being communicated to the body being negligible.

It has been found by experiment that the amount of energy absorbed by the vehicle springs caused by the vehicle wheels passing up the side of an obstacle varies as a function of the vehicle speed and that the proportion or percentage of the absorbed energy which is communicated to the vehicle frame varies inversely as a function of the speed. Since the actual energy which the body receives depends both upon the actual energy in the springs and the proportion or percentage of said energy delivered to the body the actual amount will be the product of the two. From this it will be seen that, between the very slow and very high speed, there is, for a given obstacle, a speed which causes the greatest amount of energy to be communicated to the body thereby causing the greatest discomfort to the passengers.

The sole beneficial function of any so-called shock absorber is to dissipate that part only of the energy absorbed by the springs which would otherwise be communicated to the vehicle body. Any other action is deleterious, either by jeopardizing the support of the vehicle by the springs, or by communicating extraneous forces from axle to body through the device itself.

Since, as was shown above, the amount of energy communicated to the body is proportional to the product of the amount of energy absorbed by the spring and the proportion or percentage of said energy communicated to the body, it will be seen that the dissipatory capacity of the shock absorber should also be proportional to this product. The operation of the present invention in fulfilling this requirement is as follows.

The dissipatory capacity of the shock absorber depends upon the adjustment of the control valves. Suppose a vehicle, upon which the preferred embodiment of the present invention is operatively mounted, to encounter the above mentioned hump. All parts of the mechanism are assumed to be in the central or normal position.

If the vehicle speed be very slow there will be practically no relative movement between axle and frame and therefore no displacement of any of the parts of the mechanism or any of the fluid contained therein. At this speed no energy is stored up in the springs.

If the vehicle speed be very high the axle 21 will be forced upward toward frame 20. Piston head 34 will force the fluid contained in the compression control chamber 35 out of said chamber through duct 44 and the compression control valve into the fluid reservoir. This movement of the fluid will not be resisted since the compression control valve was at zero adjustment. At the same time piston head 33 will move toward the right (see Figure 1) and fluid will be drawn into the rebound control chamber through valve 38. Also casing 87 will move toward the left carrying with it tubular member 90. The end face 91a of pusher member 91 will bear against the end of the piston rod 75 which will be urged to move to the left to compress valve spring 70. However orifice 84 restricts the flow of the fluid entrapped to the left of piston 73 in cylinder 71 and movement of piston 73 is thereby resisted. Since it was assumed that the vehicle speed was very high and the movement of arm 24 is correspondingly rapid the movement of piston 73 toward the left and therefore the compression of the valve spring 70 will be negligible. When the vehicle wheels reach the top of the hump and start down the other side the piston head 33 will move toward the left and will force the fluid entrapped within the rebound control chamber 36 through duct 42 and the rebound control valve to the fluid reservoir. The passage of the fluid through the rebound control valve is not resisted since, as explained above, the valve spring was at its normal status of zero compression. Thus in the case where a great amount of energy is absorbed by the vehicle springs, but only a negligible percentage of said energy is communicated to the vehicle body, the shock absorber offers no resistance to relative movement of frame and axle in either direction.

Now assume that the vehicle passes over the same obstacle at a speed intermediate the two extremes above mentioned. In this case although the relative movement of axle 21 and frame 20 will not be so great (since the frame rises to some extent) and therefore the movement of casing 87 will not be so far, the movement is slower and the entrapped fluid within cylinder 71 has more time to escape through the orifice 84 and therefore the piston 73 will be moved to some extent and valve spring 70 will be compressed. It will be seen that for any given obstacle, there will be some one vehicle speed lying between the two extremes, for which the movement of piston 73 to the left (Figures 1 and 5) will be a maximum. By properly proportioning the various parts the vehicle speed at which the movement of piston 73 is a maximum may be made to be the same speed at which the amount of energy communicated from the vehicle springs to the frame and body will be a maximum, and that the movement of piston 73 and therefore the adjustment of the rebound control valve will be proportional to the amount of energy communicated from vehicle springs to body at any other speeds. The same explanation applies to the adjustment of the compression control valve when the wheels travel down the slope of a hole or hollow in the road surface.

The constant of proportionality between the force stored in the vehicle springs and the resistance offered by the shock absorber may be changed by altering the proportion of the various parts as, for example, the size of the piston heads 33 and 34, the length of rocker arm 40, the differential of the control valves, rate of the valve springs etc. Thus by properly proportioning the parts the shock absorber may be adjusted so that the resistance offered to relative movement of axle 21 and frame 20 at the beginning of the rebound movement in the case of a hump or the compression movement in the case of a hollow in the road surface, may be 5%, 25%, 50%, 75%, 90% or any other desirable proportion of the force stored up in the vehicle springs at that moment. We shall assume for purposes of explanation, but without being in any way limited thereto, that the proportion has been fixed at 90%. As the rebound (or compression) stroke begins it is resisted by a force equal to 90% of the force of the vehicle springs causing the movement. As the movement continues pusher 91 lessens its pressure upon and finally leaves the piston rod 75, (or in the optional structures leaves rod 75 at the very beginning of the movement). Piston 73 begins to move to the right (Figures 1 and 5) lessening the compression of valve spring 70 and therefore the adjustment of the rebound (or compression) control valve. The movement of piston 73 is controlled, however, by the fact that the entrapped fluid must pass from right to left through the orifice 81. Thus the rate at which the adjustment of the rebound (or compression) control valve is decreasing is controlled. As the vehicle springs in the rebound (or compression) movement approach their static load position the force stored up within them is of course decreasing, becoming zero at the static load position. Therefore, if the movement of piston 73 toward the right be set slow enough, the proportionality between the force in the springs and the resistance of the shock absorber will rise until a point is reached where the factor is 100% i. e. the resistance is equal to the force. The vehicle springs will no longer control the movement, but the control will be in the movement of piston 73. As it lessens the adjustment of the control valve the vehicle springs are allowed to return the vehicle body to its normal static load position at a definite controlled rate, which rate may be that which the body would have if its movements were critically damped. In that case no disturbance of the body would last longer than one cycle.

If, during the time the proportionality factor is very high, the road wheels strike a sudden obstacle which in itself would cause relative movement of frame 20 and axle 21 in the direction that the shock absorber is resisting movement, no shock will be transmitted through the shock absorber from road wheels to vehicle body, since the control valve will, as explained above, simply open wider and accommodate the increased fluid flow, maintaining the fluid pressure and therefore the shock absorber resistance constant.

Another method of adjusting and operating the device is to set the proportionality factor at a low value, say 10% and by making orifice 81 very small adjusting the speed of movement of piston 73 to the right (Figures 1 and 5) so that it is very slow. In this case the resistance of the shock absorber will be made to vary, not so much for each individual movement of axle 21 and frame 20, but with the cumulative effect of a stretch of rough road. The resistance will vary with the roughness and especially with roughness of the type that causes large amounts of energy to be transmitted to the vehicle body.

Having described the preferred form of our invention as embodied in a hydraulic shock absorber we shall now describe an alternative embodiment of same as applied to a shock absorber of the friction type.

*Resistance unit*

Figure 2:
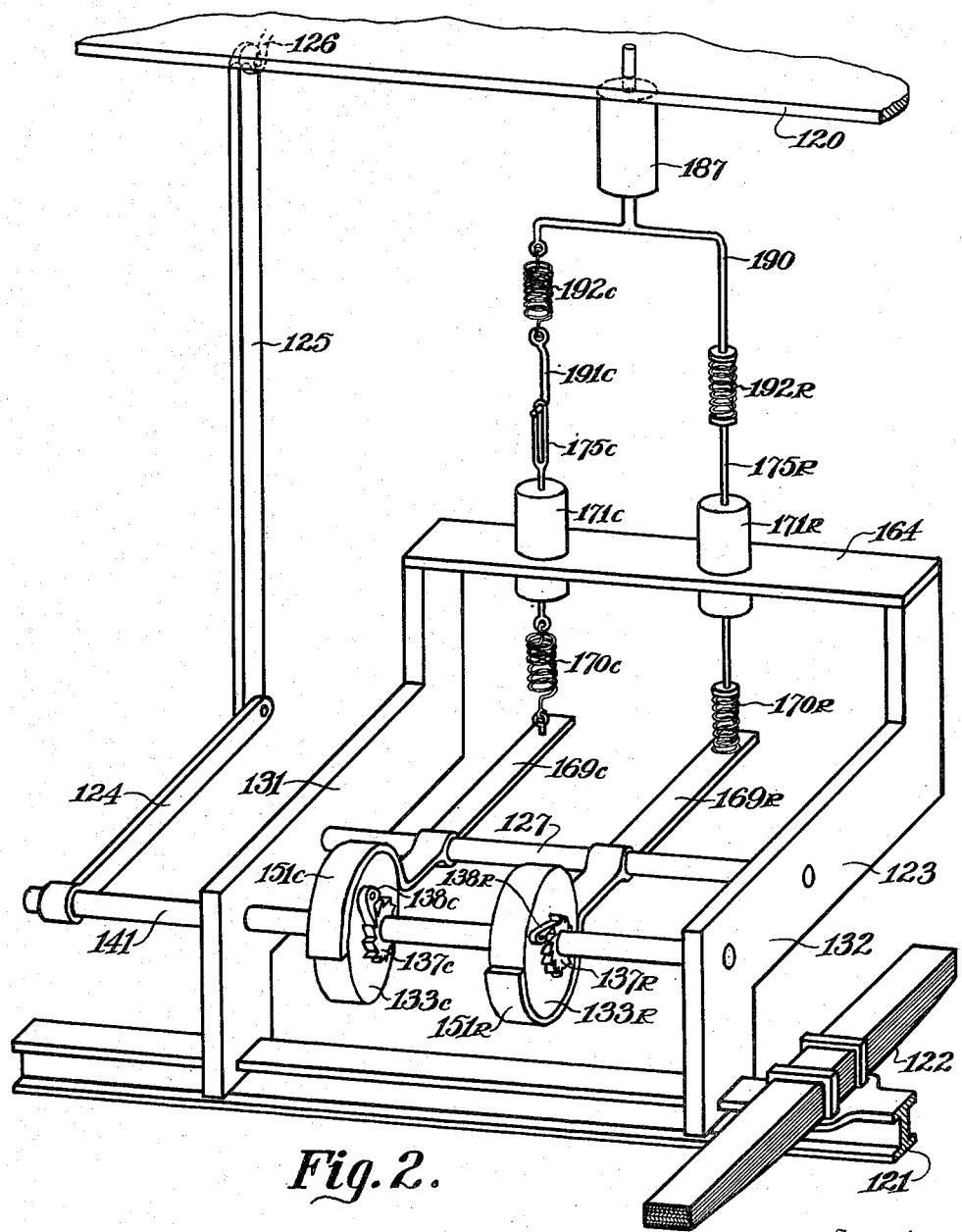
Figure 2 is a perspective view of an alternative form of the invention.

The construction of this embodiment of our invention is best understood by reference to Figures 2, 6 and 7. The numeral 120 designates the frame of a vehicle which is supported upon a vehicle axle 121 by springs 122, one of which is shown. The shock absorber 123 is shown attached to the vehicle axle 121 (or optionally to the frame as in the preferred embodiment) in any suitable manner, this shock absorber having an operating arm 124, the free end of which is swivelly secured to one end of a link 125, the opposite end of said link being swivelly attached to a bracket 126 anchored to the frame 120.

The shock absorber 123 has a framework consisting of a horizontal crosspiece 164 supported from axle 121 by end members 131 and 132 which are anchored to the axle 121 in any suitable manner. Journalled in bearings in the end members 131 and 132 is the rocker shaft 141, substantially parallel to the axle and having one end extending outside the frame, the shock absorber operating arm 124 being secured thereto. Rotatably mounted upon shaft 141 are two friction drums 133C and 133R. Keyed to shaft 141 adjacent each of the friction drums are the two ratchets 137C and 137R. Pawls 138C and 138R mounted upon said drums are arranged to coact with said ratchets. The arrangement of ratchets and pawls is such that a separation of frame 120 and axle 121 will cause shaft 141 to rotate in a direction to cause pawl 138R to engage ratchet 137R and carry friction drum 133R around with shaft 141, while pawl 138C does not engage ratchet 137C and friction drum 133C is allowed to remain stationary. On the other hand, an approaching movement of frame 120 and axle 121 will rotate shaft 141 in such a direction that pawl 138C will engage ratchet 137C and cause friction drum 133C to be carried around by the shaft, while pawl 138R does not engage ratchet 137R and friction drum 133R is allowed to remain stationary.

Friction shoes 151C and 151R, journalled upon the horizontal shaft 127 mounted in the framework end members 131 and 132 and provided with platforms 169C and 169R respectively, engage friction drums 133C and 133R respectively. The arrangement is such that a pressure downward upon platform 169R or tension applied upward from the eyelet in platform 169C will cause an increase in friction between the friction shoes and their respective drums. The parts are so constructed that the friction is independent of the speed with which the friction drums rotate.

Hooked into the eyelet attached to platform 169C is the tension spring 170C the upper end of which is hooked into an eyelet in the lower end of rod member 175C. The vertical position of member 175C and therefore the tension in spring 170C is adjustable by means and in a manner to be described later.

Bearing upon platform 169R is the compression spring 170R the upper end of which bears against a plate attached to the lower end of rod member 175R. The vertical position of member 175R and therefore the compression of spring 170R is adjustable in a manner and by means to be described later.

From the above explanation it will be seen that a rebound or separative relative movement of axle 121 and frame 120 will cause friction drum 133R to rotate and slide upon its friction shoe 151R, the friction between them and therefore the resistance to such separation or rebound being dependent upon the compression of spring 170R and independent of the speed of said relative movement. In like manner, an approach or compression relative movement of frame 120 and axle 121 will cause friction drum 133C to turn and slide under its friction shoe 151C, and the friction between the surface of drum and shoe and therefore the resistance of the shock absorber to relative movement of axle 121 and frame 120 in this direction will depend upon the tension in spring 170C and will be independent of the speed of said relative movement.

The mechanism and the method by which the springs 170C and 170R and therefore the resistance of the shock absorber to compression and rebound movements respectively are adjusted, will now be described.

*Resistance adjustment control unit*

Mounted upon the horizontal member 164 of the framework are the two cylindrical casings 171C and 171R. Since the internal construction and arrangement of parts of the two cylinders are identical only one will be described in detail. The construction is best understood by reference to Figure 6.

The casing 171R, closed at each end by fluid tight end plugs, contains a close-fitting piston 173R slidably mounted for vertical movement within the casing 171R. Piston 173R is rigidly mounted upon a piston rod 175R which extends out of the casing 171R at each end, being slidable in fluid tight bearings in the end plugs.

Piston 173R is provided with two apertures or orifices 181R and 184R. Each orifice is provided with a flap or check valve 182R and 179R respectively, so arranged that fluid may pass only in an upward direction through orifice 184R and only in a downward direction through orifice 181R. The casing 171R is filled with a suitable fluid.

It will be seen from the above explanation that a downward travel of piston 173R will be resisted by the entrapped fluid below it which can escape only through orifice 184R and that an upward travel of piston 173R will be resisted by the fluid entrapped above it which can escape only through orifice 181R. The resistance in either direction may be increased by decreasing the size of the appropriate orifice or decreased by increasing the size of the appropriate orifice.

The lower end of piston rod 175C extending below casing 171C is provided with an eyelet into which the upper end of spring 170C is hooked. The upper end of piston rod 175C is provided with the slotted portion through which projects the right angle finger of the hook member 191C which is provided at its upper end with an eyelet into which the lower end of a tension spring 192C is hooked, the upper end of which is hooked into an eyelet formed in one end of the bifurcated member 190. The normal position of the right angle finger of member 191C is in the upper end of the slot in piston rod 175C so that if member 191C moves upward from its normal position it will carry piston rod 175C with it, but if it moves downward the finger slides in the slot and piston rod 175C is not moved.

Piston rod 175R is provided at its lower end with a circular plate which bears against the upper end of the compression spring 170R, and at its upper end with a circular plate upon which rests (but unattached thereto) the compression spring 192R which is attached to a circular plate fixed upon one end of the bifurcated member 190, which member is attached to the frame 120 by a load change compensating mechanism which will be described later.

The operation of the mechanism so far described is as follows: Assume the attachment of the member 190 to the frame 120 to be rigid for purposes of this explanation, and also that the springs 170C, 170R, 192C and 192R are neither extended nor compressed. Since the framework is rigidly mounted upon the axle 121 any movement of axle 121 relative to the vehicle frame 120 will cause a corresponding movement of the framework and all of the parts mounted thereon, relative to the vehicle frame 120.

Suppose that, due to the road wheels striking a hump in the road surface, the vehicle springs 122 are compressed and the axle 121 is forced upward toward the frame 120. Suppose, first, that the vehicle's road speed is so great that the up and down movement of the car wheels is so fast that the smooth horizontal travel of the vehicle frame and body will not be disturbed—a condition which, it is evident, does not need any sort of shock absorber. In this case the upward movement of the axle 121 causes the spring 192R to be compressed. Spring 192R bears down upon the piston rod 175R but rod 175R is prevented from moving more than a negligible amount by the fact that the fluid entrapped beneath piston 173R cannot escape fast enough through orifice 184R. Therefore spring 170R is protected from the down thrust of spring 192R and remains uncompressed, and therefore the drum 133R encounters negligible friction from its shoe 151R as the axle 121 separates from frame 120 due to the road wheels traveling down the far side of the hump in the road surface.

Suppose, however, that this hump in the road surface, or an identical one, is encountered by the road wheels at a vehicle speed considerably less than that just described. In this case energy will be absorbed by the vehicle springs and a considerable portion of it will be transmitted to the vehicle body and frame in the form of an unpleasant rebound. Clearly a shock absorber is required in this case, to dissipate the energy contained in the springs which would otherwise be transmitted to the vehicle body and frame.

As before the upward movement of the axle 121 relative to the frame causes spring 192R to be compressed. In this case the movement is slower and the compression of spring 192R lasts long enough that the piston 173R moves downward an appreciable distance and spring 170R is thus compressed a corresponding distance, and the pressure of shoe 151R against drum 133R is increased. This friction resists the rebound movement of the vehicle springs, dissipating the energy which causes the rebound.

As the return of the axle to its normal distance from the frame takes place the spring 170R urges the piston 173R to move in an upward direction, diminishing the compression of spring 170R. The rate at which the decompression takes place, and therefore the rate at which the friction of drum 133R and shoe 151R is diminished, is controlled by the size of orifice 181R, through which the fluid entrapped above piston 173R must pass before the piston can move upward. The action of the compression control side of the mechanism in controlling the excessive compression of the vehicle springs as the road wheels pass up the back side of a hole or hollow in the road surface, is similar to the above, except that springs 170C and 192C work in tension.

Sudden movements due to the wheels striking obstacles while the friction is being reduced are not transmitted to the body or frame of the vehicle through the shock absorber since they merely cause an increased rotation of the friction drums without any increase in friction.

*Load change compensator*

Instead of being rigidly attached to frame 120, as was assumed above for simplicity of explanation, the bifurcated member 190 is provided with one leg which acts as a piston rod sliding through the end caps 189 of a cylindrical casing 187 which is mounted upon the frame 120. A piston 194 (see Figure 7) having a very small aperture 197 is affixed to member 190 within cylinder 187. Cylinder 187 is filled with a suitable fluid. If the static load upon the vehicle frame is changed, thus causing a compression of springs 192R and 170R or a tension in springs 192C and 170C, this tension or compression causes piston 194 to move either up or down, as the case may be, within cylinder 187 to ease said tension or compression and return the springs to their normal position. Aperture 197 is made so small that this movement takes considerable time, being so slow that it is not appreciably affected by ordinary rough road surfaces.

Accordingly, it will be seen that in the present invention we have provided means, capable of use with either hydraulic or friction type shock absorbers, which automatically adjust the shock absorber resistance in accordance with the nature of the road surface over which the vehicle is being operated whereby said shock absorber will properly resist relative movements between the body and axles of the vehicle, i. e. the shock absorber will resist only those relative movements wherein energy is being communicated from vehicle springs to body to cause objectionable movements thereof; which will offer to those relative movements just sufficient resistance to dissipate the proper amount of energy for any given case; which will resist the return of the body from a displaced position to the normal load position in such manner that said return movement will take place in the manner that said movement would take place if said movement were critically damped; and which, while resisting any relative movements of axle and body, will not transmit from axle to body any shock caused by the road wheels striking obstructions in the road surface.

It will, of course, be evident to those skilled in the art, that the broad principles of our invention may be applied to other types of shock absorbers than those described above. For instance, the shock absorber may be "single acting" i. e. it may resist relative movement of axle and body in one direction only.

While the forms of embodiment of the present invention as herein disclosed, constitute a preferred and an alternative form, it is to be understood that other forms might be adopted, all coming within the scope of the claims which follow.

*Definitions*

In the above description the terms "vibratory mass" and the "natural period" thereof refer to the vehicle body and frame as a mass free to vibrate upon the vehicle springs. When no forces other than the downward pull of gravity, and the upward lift of the springs are acting upon the vehicle body it will rest at a point where these forces are in equilibrium. This point is termed the normal static load position relative to the axle upon which the vehicle springs are mounted. If the body is displaced from this position and released it will execute an oscillatory or vibratory motion passing through the normal static load position as a center. The period of these oscillations is termed the natural period of oscillation. The energy imparted to the system by the initial displacement resides at the end of each swing wholly in the springs as potential energy, and at the center of the swing, wholly in the mass of the body as kinetic energy. The oscillations will continue until the energy is dissipated by friction or other damping means. If a damping means having the characteristic $R=KV^n$ where R is the resistance offered to the movement, K is the damping constant, V is the velocity of movement, $n$ is an exponent denoting some power of the velocity; is operatively connected to the system it will dissipate the energy contained in the system. The larger the constant of damping K is made the more energy is dissipated with each oscillation. By making K sufficiently large the damping means may be made to dissipate all of the energy imparted to the system by the displacement of the body, in the return stroke back to the normal static load position. Since all of the energy has been dissipated there will be no kinetic energy in the body at this point and the body will therefore not swing past the normal static load position. The value of K which satisfies this condition is the critical damping value and the damping caused thereby is termed critical damping, and the body movements are said to be critically damped, or aperiodic.

What is claimed is as follows:

1. In a vehicle shock absorber, means for automatically increasing the resistance of the absorber to spring action in accordance with the amplitude and time interval of said action, said resistance, after being once set, being independent of the speed of said action, means for returning its resistance to normal, and means for delaying said return, independently of said spring action.

2. The combination with a vehicle shock absorber having operating means for resisting the relative motions of axle and body, of means for automatically varying the action of said operating means to adjust the degree of control thereof to suit the road surface conditions and the speed of the vehicle in passing over same, said action varying means being initially operated by a relative movement of axle and body in a direction away from their normal static load relative position to set the degree of resistance offered by the said operating means to relative movement in the opposite direction, and means operable to return said resistance to its normal value at a predetermined rate.

3. In a vehicle shock absorber having means for resisting relative movement of the axle and body of the vehicle, resilient means whereby said resistive means is caused to offer resistance; a second resilient means, movable by relative motion of the axle and body of the vehicle, and operable thereby to vary the compression of said first mentioned resilient means and thereby vary the resistance offered by said resistive means; dashpot means resisting the compression of the first resilient means; said dashpot means also acting to resist decompression of said first resilient means.

4. In a vehicle shock absorber having means for resisting relative movement of the axle and body of the vehicle, resilient means whereby said resistive means is caused to offer resistance; a second resilient means, movable by relative motion of the axle and body of the vehicle, and operable thereby to vary the compression of said first mentioned resilient means and thereby vary the resistance offered by said resistive means; dashpot means resisting the compression of the first resilient means; said dashpot means also acting to resist decompression of said first resilient means; and a second dashpot means for compensating for the effect of a change in the static load of the vehicle upon the position of said second movable resilient means.

5. In a vehicle shock absorber having means for resisting relative movement of the axle and body of the vehicle, resilient means whereby said resistive means is caused to offer resistance; a second resilient means, movable by relative motion of the axle and body of the vehicle, and operable thereby to vary the compression of said first mentioned resilient means and thereby vary the resistance offered by said resistive means; dashpot means resisting the compression of the first resilient means; said dashpot means also acting to resist decompression of said first resilient means, said dashpot means comprising a cylinder; a piston operative within said cylinder and operatively connected with said first resilient means; orifices associated with said piston, check valves carried by said piston and operative to direct fluid flow through one of said orifices upon a movement of the piston in one direction and through the other of said orifices upon a movement of the piston in the other direction; and a second dashpot means for compensating for the effect of a change in the static load of the vehicle upon the position of said second movable resilient means.

6. In a shock absorber the combination with sprung and unsprung masses, of means for resisting relative movements of the said masses, said resistance means being characterized by the fact that its resistance is substantially independent of the speed of said movement and further that its mechanism is capable of being adjusted in such manner that the resistance it offers may be varied; resilient means connecting the resistance means with one of said masses whereby a movement of said mass relative to the other of said masses normally causes an alteration in the resistance of said resistance means; and a dashpot connected to said resilient means and resisting said alteration of adjustment.

7. In a shock absorber the combination with sprung and unsprung masses, of resistance means mounted upon one of the masses and having a connection to the other of the masses whereby said resistance means resists relative movements of the masses, said resistance means being characterized by the fact that its resistance is substantially independent of the speed of said movements, adjustable resistance controlling means carried by the resistance means and operable to vary the resistance of the resistance means, resilient means connecting the controlling means and the one of said masses upon which the resistance means is not mounted whereby relative movements of the masses urge a movement of the controlling means to alter the resistance of the resistance means, and fluid pressure controlled means, connected to said resilient means and operative to resist said movement of the controlling means.

8. In a shock absorber for vehicles having sprung and unsprung portions the combination of means of resisting relative movements of the sprung and unsprung portions of the vehicle, said resisting means being capable of being adjusted so as to offer varying amounts of resistance to said relative movements, the resistance offered by said resisting means being substantially independent of the velocity of said relative movement; means operable by said relative movements to adjust the resistance of said resistive means in proportion to the magnitude of and the time consumed by said movements; means operable to return the adjustment of said resistive means to a predetermined minimum at a predetermined rate; and means for compensating for a change in the static load upon the operation of said adjusting means.

9. In a hydraulic shock absorber the combination of means for circulating a fluid in accordance with the relative movements of the axle and body of a vehicle, a valve for opposing said fluid circulation, a valve spring, a pusher spring, means whereby relative movement of axle and body of the vehicle produces relative movement of said springs causing them to compress one another, and fluid dashpot means resisting the compression of the valve spring.

10. In a hydraulic shock absorber the combination of means for circulating a fluid in accordance with the relative movements of the axle and body of a vehicle, a valve for opposing said fluid circulation, a valve spring, a pusher spring, means whereby relative movement of axle and body of the vehicle produces relative movement of said springs causing them to compress one another, and fluid dashpot means resisting the compression of the valve spring; and fluid pressure operated clutching means operable to prevent decompression of said pusher spring.

11. In a hydraulic shock absorber the combination of means for circulating a fluid in accordance with the relative movements of the axle and body of a vehicle, a valve for opposing said fluid circulation, a valve spring, a pusher spring, means whereby relative movement of axle and body of the vehicle produces relative movement of said springs causing them to compress one another, fluid dashpot means resisting the compression of the valve spring; and means controlled by said relative movement, operable to prevent decompression of said pusher spring.

12. A hydraulic shock absorber for vehicles having a casing providing a fluid reservoir and a cylinder in which a piston forms a displacement chamber; means for introducing fluid into the displacement chamber in response to movement of the piston in one direction; a duct connecting the displacement chamber and the reservoir; a spring loaded valve normally shutting off said duct but adapted to be actuated by fluid pressure in the displacement chamber to establish a restricted flow of fluid from the displacement chamber into the reservoir in response to movement of the piston in the other direction; resilient means for loading said valve; means for varying the loading upon said valve whereby its restriction to fluid flow will be varied, in accord with the amplitude of and the time consumed by relative movements of the axle and body of the vehicle, comprising a member movable within the casing by said relative movements; a second resilient means carried by said movable member and normally abutting said first resilient means; dashpot means operatively connected to the first resilient means whereby compression of the first resilient means by the second resilient means due to movement of said movable member is resisted; said dashpot means also acting to resist decompression of said first mentioned resilient means.

13. A shock absorber for vehicles comprising a friction member and a friction shoe relatively movable by relative movements of axle and body of the vehicle; resilient means for loading said friction shoe against said friction member; means for varying the loading of said shoe, comprising a member movable relative to said shoe by relative movements of axle and body; a resilient means, carried by said movable member and adapted to compress said first mentioned resilient loading means with said movements; a dashpot member interposed between the two resilient means and acting to resist the compression of the first mentioned means by the second resilient means; said dashpot means also acting to resist decompression of said first mentioned resilient means.

14. In a hydraulic shock absorber in combination with means for circulating fluid therethrough in response to vehicle spring movements, a fluid flow control valve comprising a main pressure chamber, ports opening out from said chamber at opposite ends thereof, a valve disc positioned within said chamber and normally closing one of said ports, a valve disc positioned without said chamber and normally closing another of said ports, an auxiliary cylindrical pressure chamber into which the last mentioned port opens, a piston operating in said auxiliary pressure chamber, a stem rigidly connecting the valve discs and the piston, and means yieldably urging said valve discs to close said ports.

15. In a hydraulic shock absorber a fluid flow control valve comprising a main pressure chamber having a cylindrical shape, ports opening from each end of the chamber, one port being of larger diameter than the other, a valve disc located within the chamber and operatively associated with the smaller port to normally close same, an auxiliary pressure chamber connected to the main pressure chamber by means of the larger of said ports, and having a cylindrical portion, the internal diameter of said cylindrical portion being larger than that of either of said ports, a valve disc located within said auxiliary chamber and operatively associated with the larger port to normally close same, a loose fitting piston located in said cylindrical portion of the auxiliary chamber, a stem rigidly connecting the valve discs and the piston, and means yieldably urging the valve discs to close the ports.

ROBERT T. KILLMAN.
THOMAS A. KILLMAN.